(12) United States Patent
Jan et al.

(10) Patent No.: US 7,961,746 B2
(45) Date of Patent: Jun. 14, 2011

(54) ADVANCED SINGLE-CHIP USB-TO-ETHERNET CONTROLLER WITH A DUAL-PHY MODE CAPACITY FOR ETHERNET PHY OR USB-TO-REV-MII BRIDGING

(75) Inventors: Hsun-Yao Jan, Tayuan Township, Taoyuan County (TW); Chin-Chia Kang, Yanshui Town, Tainan County (TW); Yung-Ta Chan, Baoshan Township, Hsinchu County (TW); Chih-Tsung Lin, Hsinchu (TW)

(73) Assignee: Asix Electronics Corporation, Hsin Chu (TW)

( * ) Notice: Subject to any disclaimer, the term of this patent is extended or adjusted under 35 U.S.C. 154(b) by 827 days.

(21) Appl. No.: 11/970,285

(22) Filed: Jan. 7, 2008

(65) Prior Publication Data

US 2009/0175283 A1 Jul. 9, 2009

(51) Int. Cl.
*H04L 12/66* (2006.01)
(52) U.S. Cl. ......................... 370/419; 370/463; 709/250
(58) Field of Classification Search .................. 370/252, 370/400, 401, 419, 420, 463; 709/227–229, 709/250
See application file for complete search history.

(56) References Cited

U.S. PATENT DOCUMENTS

| | | | | |
|---|---|---|---|---|
| 6,370,603 B1* | 4/2002 | Silverman et al. | ............... | 710/72 |
| 6,633,921 B1* | 10/2003 | Pan | ............................... | 709/250 |
| 6,711,162 B1* | 3/2004 | Ortega et al. | ................. | 370/389 |
| 7,164,690 B2* | 1/2007 | Limb et al. | ...................... | 370/443 |
| 7,280,547 B2* | 10/2007 | Featherston et al. | .......... | 370/401 |
| 2002/0091861 A1* | 7/2002 | Kim et al. | ...................... | 709/249 |
| 2003/0023762 A1* | 1/2003 | Dhir et al. | ...................... | 709/250 |
| 2003/0185174 A1* | 10/2003 | Currivan et al. | .............. | 370/335 |
| 2004/0125809 A1* | 7/2004 | Jeng | ......................... | 370/395.53 |

\* cited by examiner

*Primary Examiner* — Hassan Phillips
*Assistant Examiner* — Duc T Duong
(74) *Attorney, Agent, or Firm* — Ming Chow; Sinorica, LLC

(57) ABSTRACT

This invention relates to a single-chip USB-to-Ethernet controller that can operate either as a standalone USB-to-Ethernet controller integrated circuit chip in one mode, or the Ethernet PHY or the USB-to-Rev-MII Bridging chip in another mode, namely Dual-PHY mode, to interface with an external Network Microcontroller's Ethernet MAC for providing Ethernet and USB Device interface in a network communication system and to provide a mechanism for auto-detection and auto-selection between the Ethernet interface and USB Device interface through some Station Management Register access wherein the Network Microcontroller's Ethernet MAC can access two PHY devices through the same Station Management Interface.

20 Claims, 9 Drawing Sheets

Proposed Invention: Example Network Communication System Featuring Ethernet and USB Interfaces Utilizing the Application Specific Integrated Circuit of the Proposed Invention

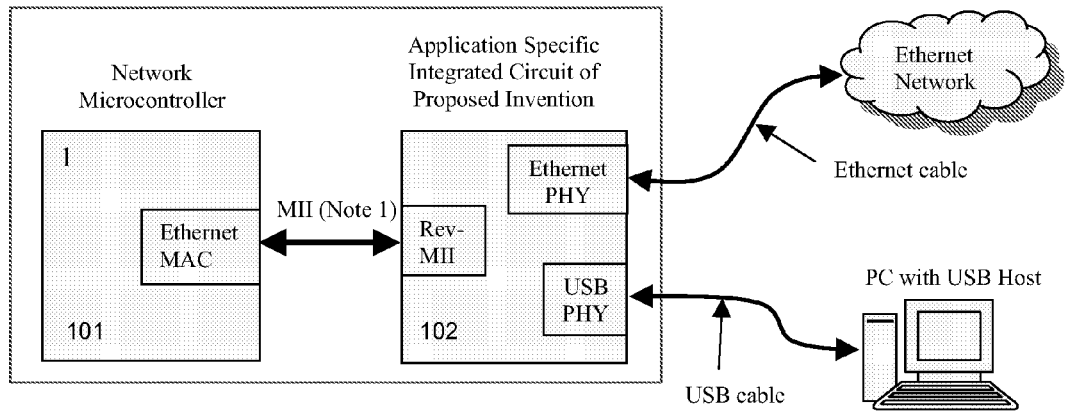
Figure 1: Proposed Invention: Example Network Communication System Featuring Ethernet and USB Interfaces Utilizing the Application Specific Integrated Circuit of the Proposed Invention
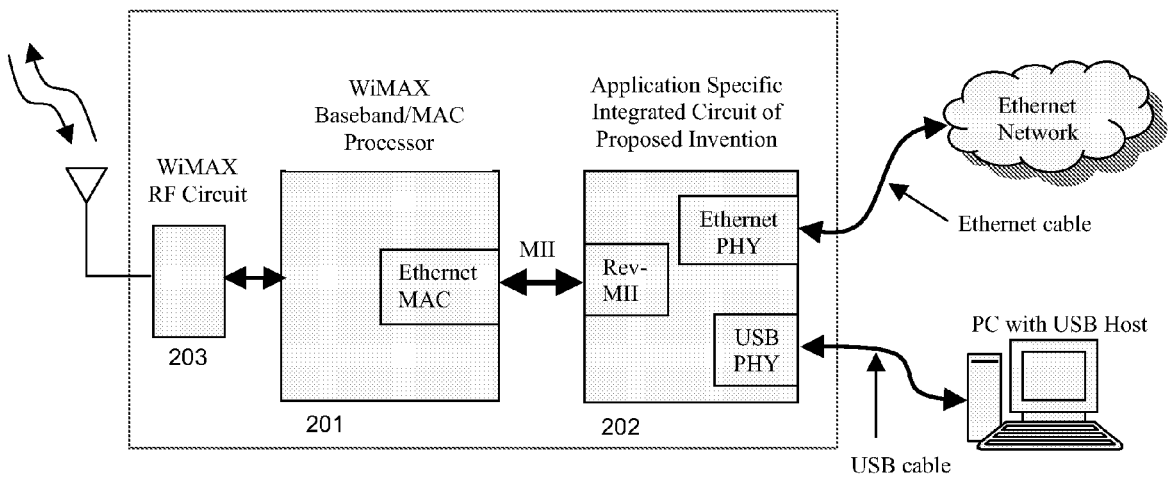
Figure 2: Example System Utilizing Proposed Invention: WiMAX Modem Featuring Ethernet and USB Interfaces

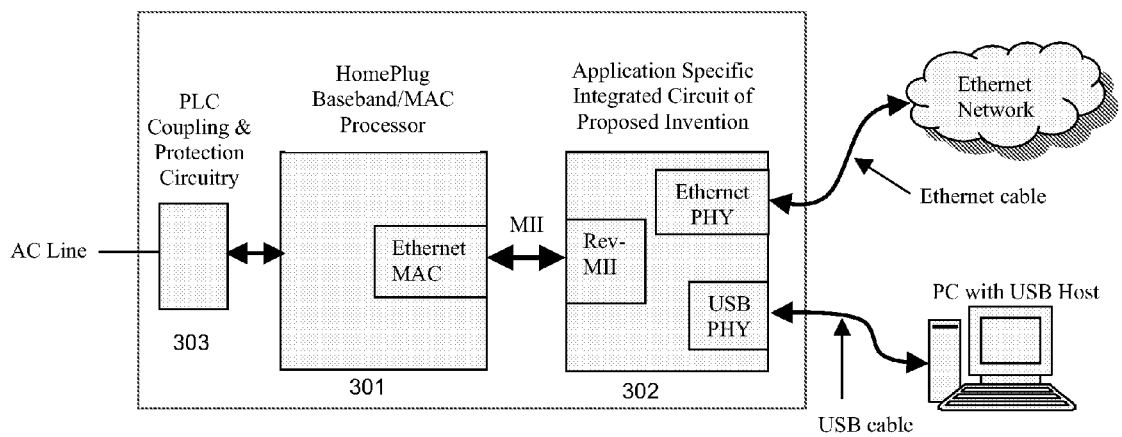
Figure 3: Example System Utilizing Proposed Invention: HomePlug Adapter Featuring Ethernet and USB Interfaces
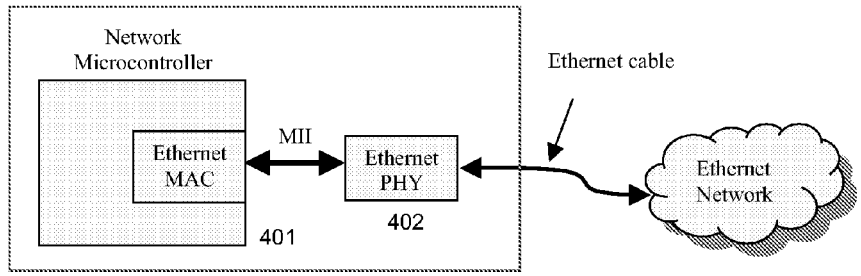
Figure 4: Network Communication System Featuring Ethernet Interface Only
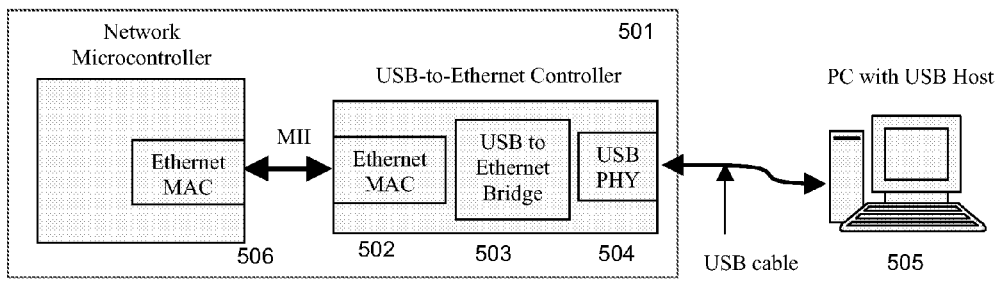
Figure 5: Network Communication System Featuring USB Interface Only

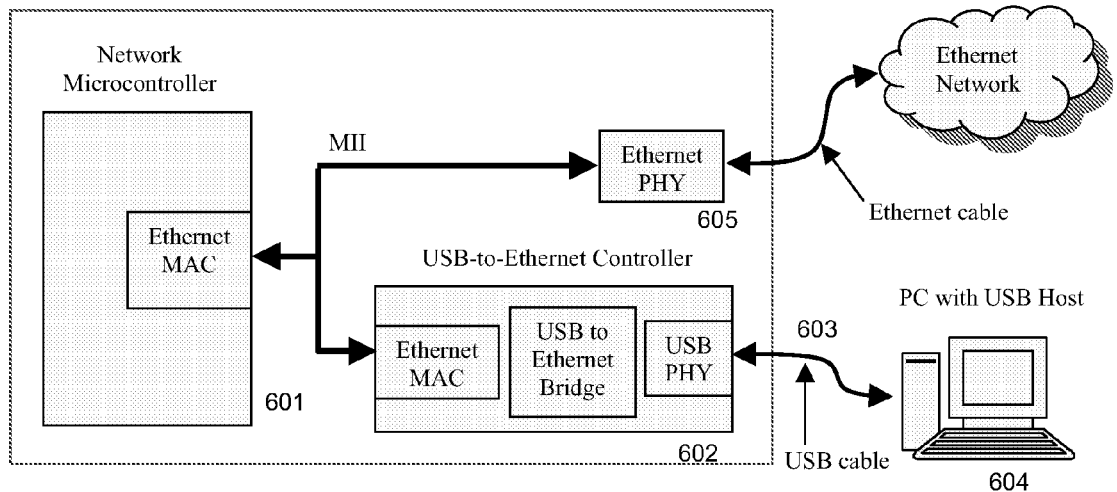
Figure 6: Network Communication System Featuring Ethernet and USB Interfaces
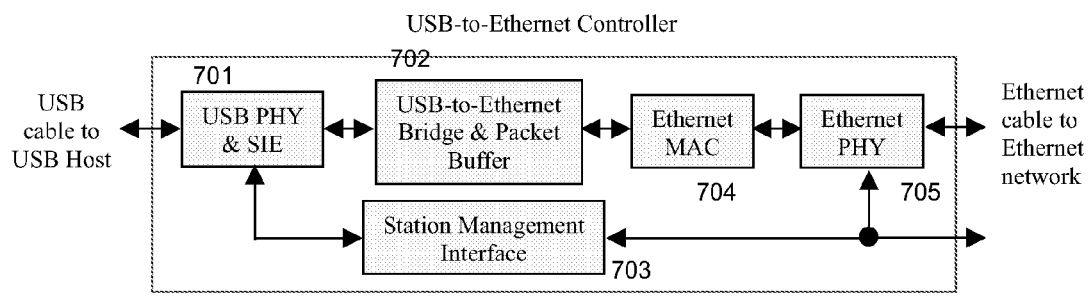
Figure 7: Proposed Invention: Mode 1, USB-to-Ethernet Controller

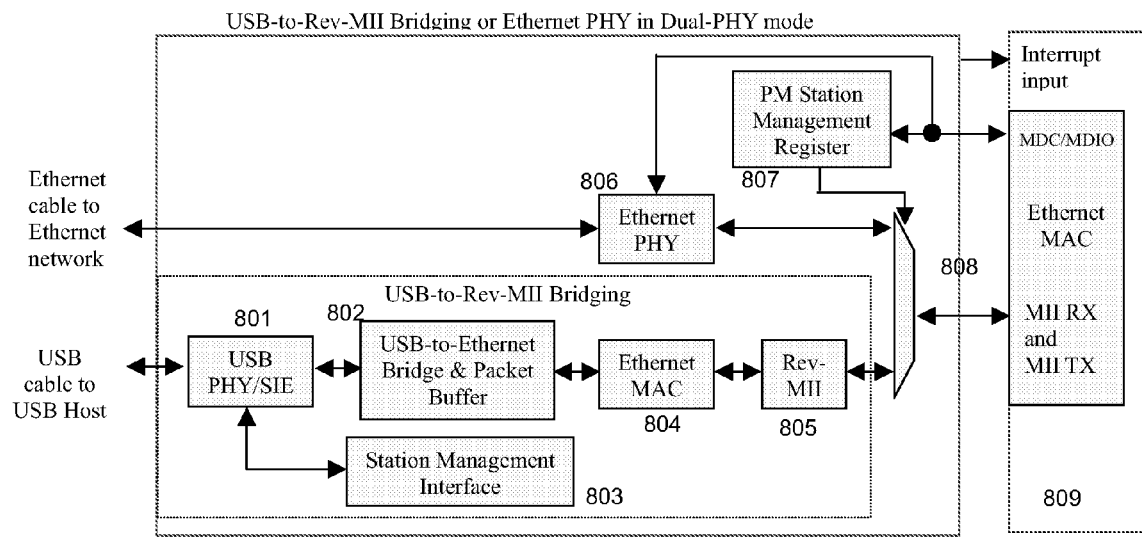
Figure 8: Mode 2, USB-to-Rev-MII Bridging or Ethernet PHY in Dual-PHY Mode
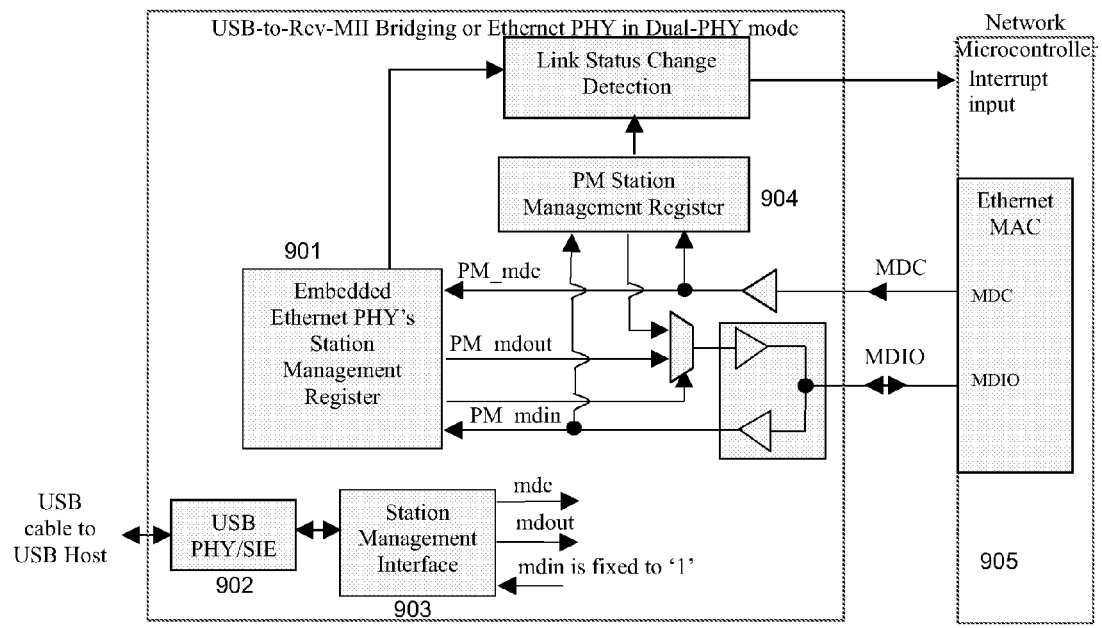
Figure 9: Two Sets of Station Management Registers Accessible From the Network Microcontroller's Ethernet MAC inDual-PHY Mode

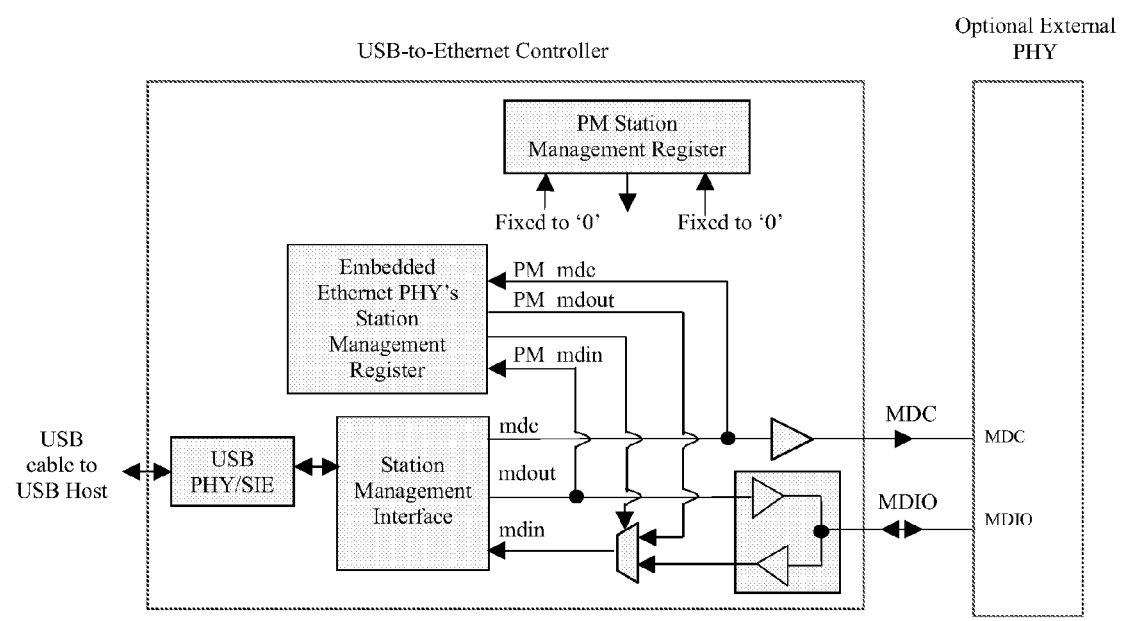
Figure 10: Embedded Ethernet PHY' Station Management Register is Accessible from USB Host in standalone USB-to-Ethernet Controller Mode

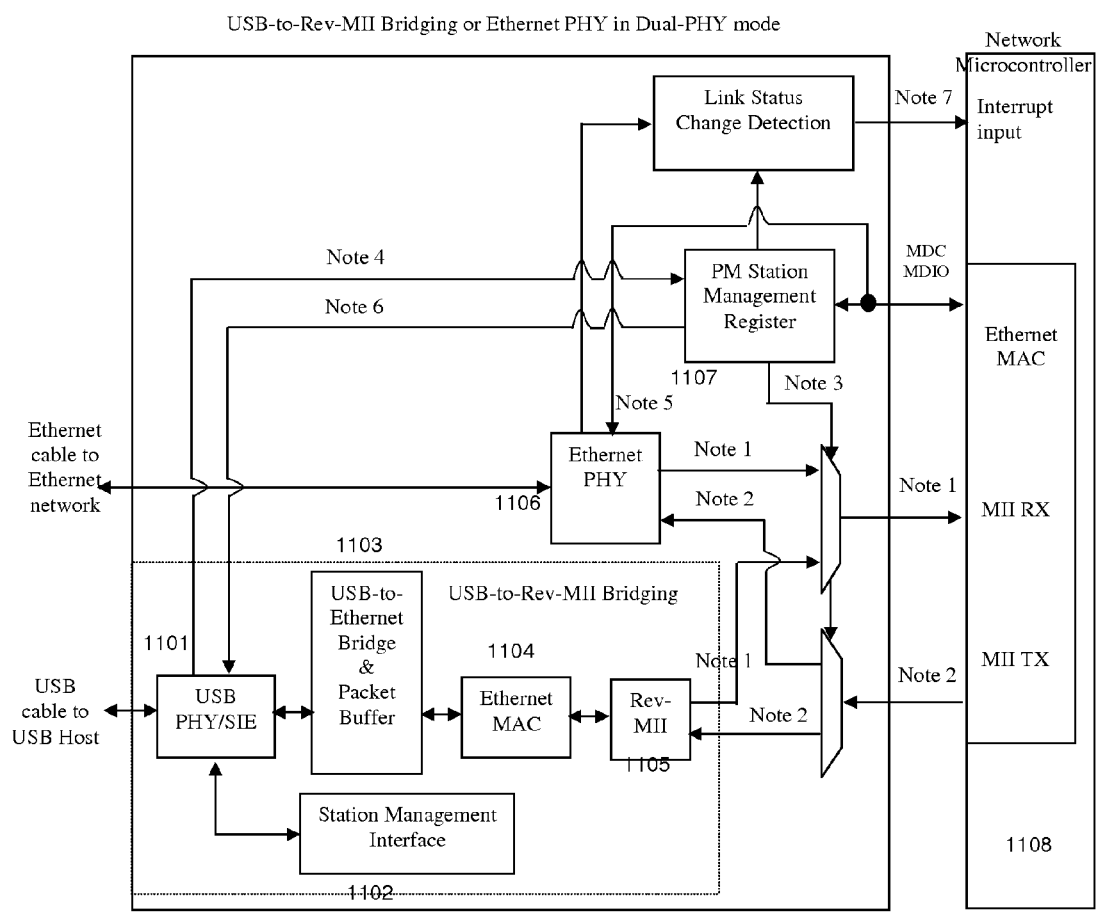
Figure 11: Auto-Detection and Auto-Selection between Ethernet PHY and USB-to-Rev-MII Bridging in Dual-PHY mode.

Figure 12: Flow chart (1/2)
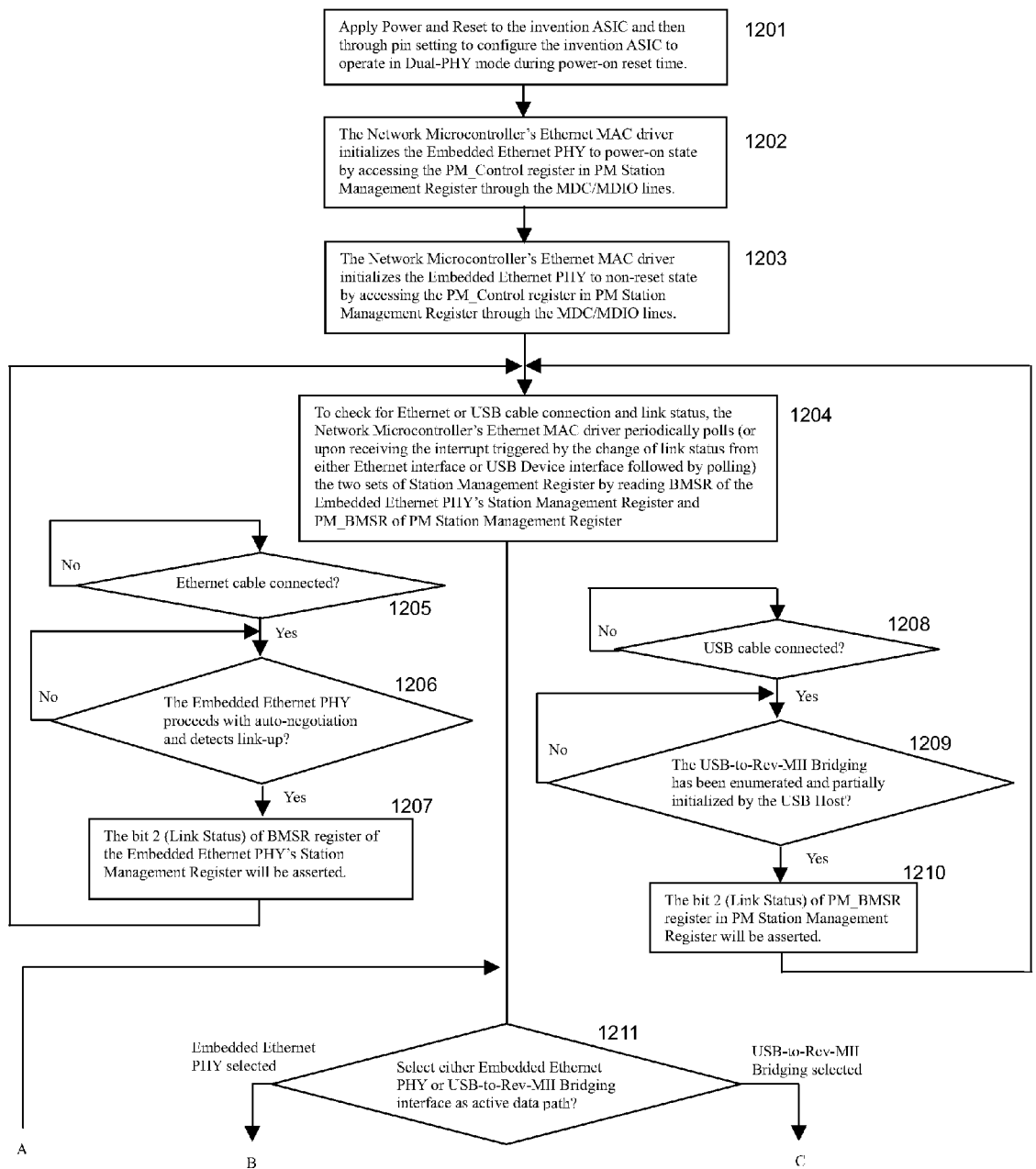

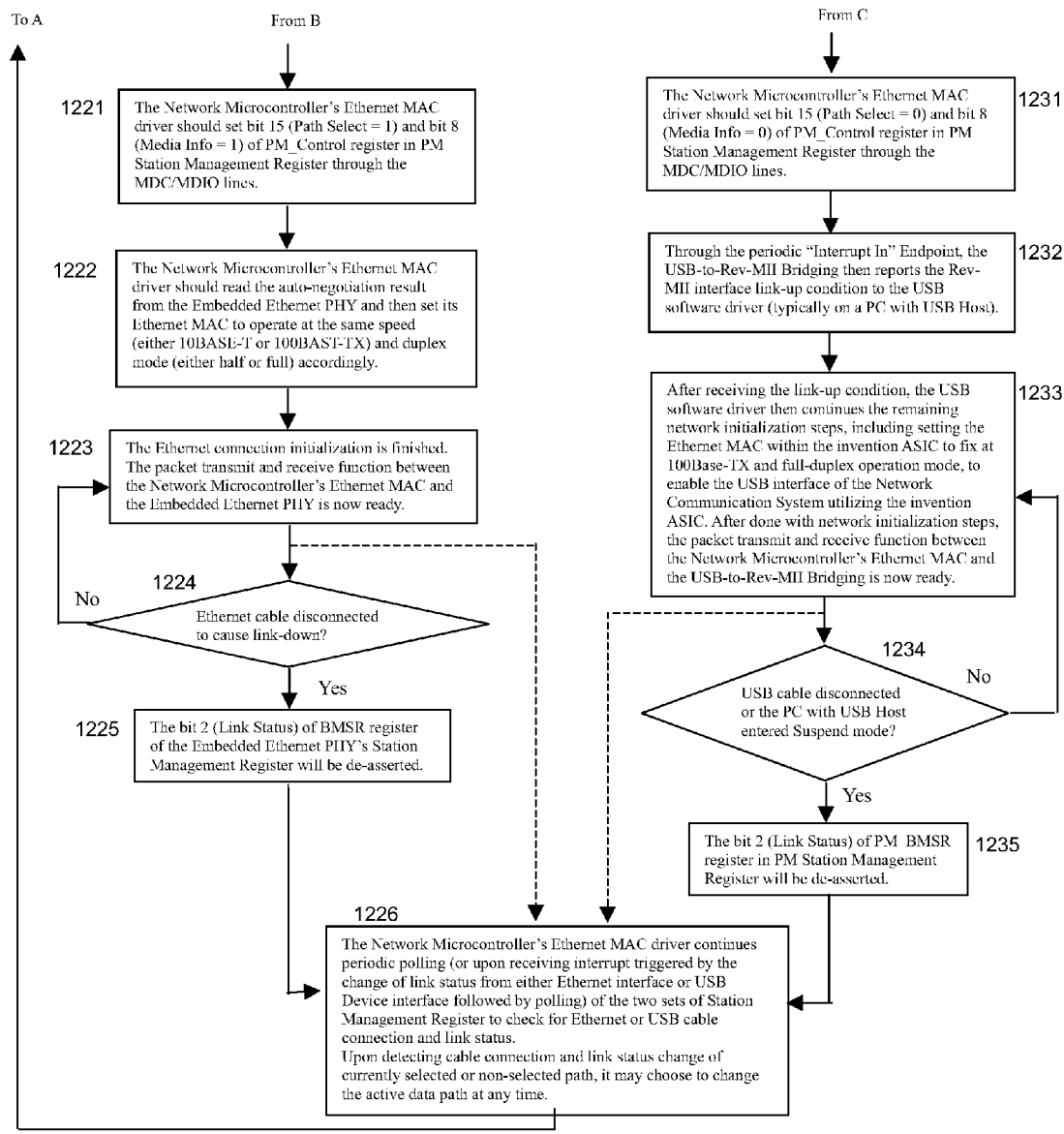
Figure 12 (2/2): Flow chart

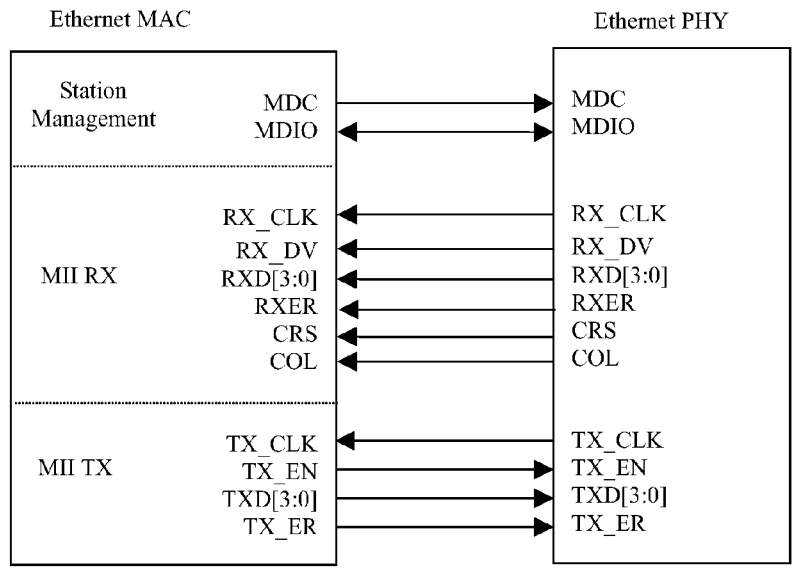
Figure 13: MII Interface
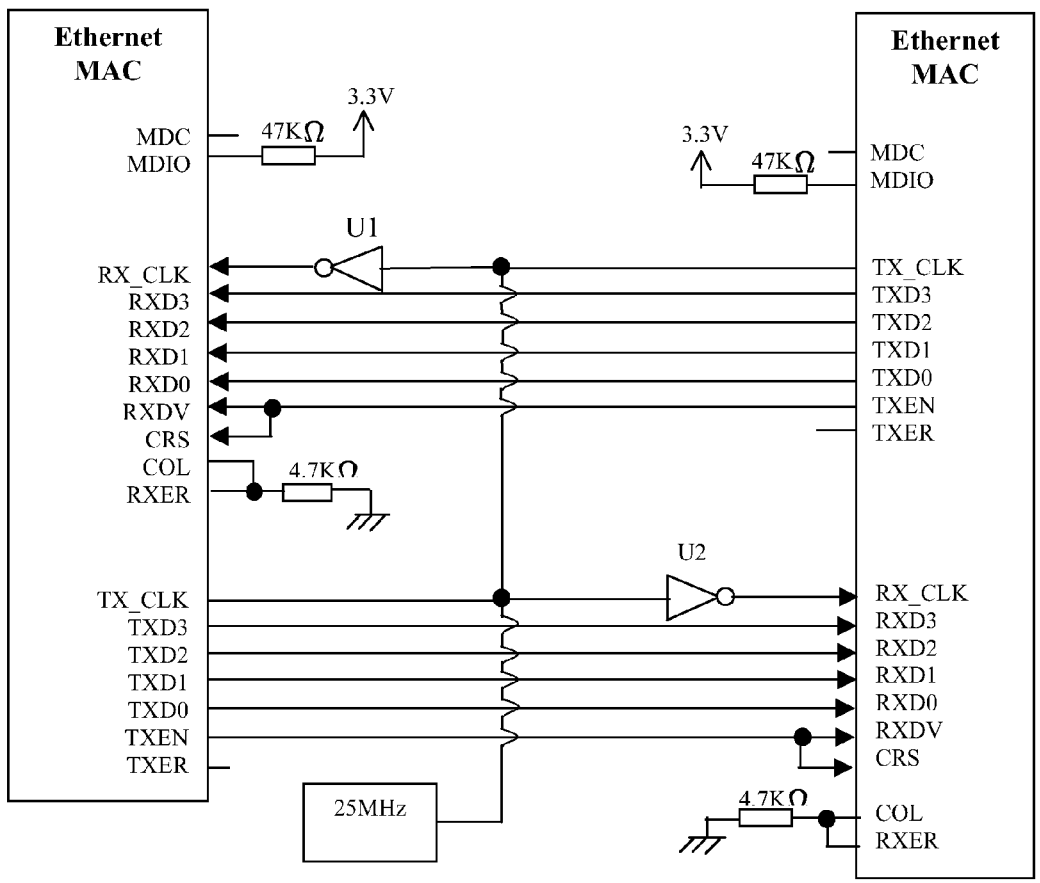
Figure 14: MII Interface MAC-MAC

ADVANCED SINGLE-CHIP USB-TO-ETHERNET CONTROLLER WITH A DUAL-PHY MODE CAPACITY FOR ETHERNET PHY OR USB-TO-REV-MII BRIDGING

FIELD OF INVENTION

The present invention relates generally to a single-chip USB-to-Ethernet controller ASIC that can operate either as a standalone USB-to-Ethernet controller ASIC in one mode, or the Ethernet PHY or the USB-to-Rev-MII Bridging chip in another mode, namely Dual-PHY mode, to interface with an external Network Microcontroller's Ethernet MAC for providing Ethernet and USB Device interface in a network communication system. The combined functions and features make the network communication system design more cost effective, smaller in form-factor and simplified. This makes the system and software design for the Ethernet interface and USB Device interface selection decision much easier and simpler on the Network Microcontroller.

BACKGROUND OF THE INVENTION

Many network communication systems often need to provide Ethernet interface and USB Device interface that allow external electronics device to communicate with it using either interface of choice. Typically, the Ethernet interface is applied for interconnecting to an Ethernet network, a PC, a laptop computer or another network communication system through a regular Ethernet cable while the USB Device interface (as a USB Communication Class device) is applied for interconnecting to a USB Host built-in to a PC, a laptop computer or any embedded system through a regular USB cable.

There are some common system design approaches with related problems for above mentioned network communication systems that need the support of Ethernet and USB interface.

The first problem deals with the Network Communication System Featuring Ethernet Interface Only.

FIG. 4 illustrates a typical network communication system supporting Ethernet interface for interconnecting to an Ethernet network, a PC, a laptop computer or another network communication system through a regular Ethernet cable. Typically, an Ethernet PHY chip 402 is used for providing physical layer function for the Ethernet MAC of the Network Microcontroller 401.

The second problem deals with the Network Communication System Featuring USB Interface Only.

FIG. 5 illustrates a typical network communication system supporting USB interface for interconnecting to a USB Host 505 built-in to a PC, a laptop computer or any embedded system through a regular USB cable. Typically, a USB-to-Ethernet Controller chip 501 is used for bridging between the external USB Host 505 and the Ethernet MAC 506 of Network Microcontroller. Usually the Ethernet MACs in both the Network Microcontroller and the USB-to-Ethernet Controller only support the pure MAC function, so to interconnect two Ethernet MAC through the MII interface; a special MAC-to-MAC connection circuitry must be used. FIG. 14 show typical examples for MAC-to-MAC connection using MII interface between two Ethernet MAC devices.

FIG. 13 illustrates typical MAC-to-PHY connection using MII interface between two Ethernet MAC device and Ethernet PHY device.

Note that FIG. 5 does not apply to the case where the USB Device PHY interface already been integrated into the Network Microcontroller, in which case, it is not related to the proposed invention (not a USB Communication Class device).

The third problem deals with the Network Communication System Featuring Ethernet and USB Interfaces.

FIG. 6 illustrates a typical network communication system supporting Ethernet and USB interfaces. Usually an Ethernet PHY chip 603 and a USB-to-Ethernet controller chip 602 are used and they are sharing the same MII interface of the Ethernet MAC of the Network Microcontroller 601. To support such interconnection, there are following restrictions:

Both the Ethernet PHY chip and the USB-to-Ethernet Controller chip must support tri-state mode on its MII interface. In other words, when Ethernet interface is in use, the USB-to-Ethernet Controller chip must be set to tri-state on its MII interface in order not to interfere with the Ethernet PHY chip, or vice-versa. If either one's MII interface is not capable of entering tri-state mode, some external glue logics such as bus transceiver chip would be required.

Usually the Ethernet MAC of the USB-to-Ethernet Controller chip is a pure MAC device that does not allow it to glue less interconnect with the Network Microcontroller directly, not to mention having it share with the Ethernet PHY chip through the same MII interface of the Network Microcontroller. Again the special MAC-to-MAC connection circuitry must be used.

If the network communication system supports automatic detection and selection for the use of Ethernet interface and USB interface, some external glue logics would be required. The automatic detection and selection means, for example, if user plugs in Ethernet cable, the Ethernet PHY chip should be enabled automatically to be the active path inter networking with the Network Microcontroller, or if USB cable is plugged in, the USB-to-Ethernet Controller chip should be enabled as active path instead. The designer of the network communication system can define his own rule of which one takes the priority to be the active path when the Ethernet and the USB cable are both plugged in by user at the same time.

Usually the Ethernet MAC of the USB-to-Ethernet Controller is a pure MAC function, which means, it doesn't allow the Ethernet MAC of Network Microcontroller to control/configure its operation mode or check its operation status via the commonly used Station Management Interface (MDC and MDIO lines) as defined in IEEE 802.3u standard. The Ethernet MAC of the USB-to-Ethernet Controller, also as a Station Management Interface master, actually expects to control/configure/check the external device. Therefore, some external glue logics would be required to allow the Network Microcontroller to select the active path based on user's cable connection action. Note that the Ethernet PHY chip usually can be configured through its Station Management Interface (MDC and MDIO lines).

SUMMARY OF THE INVENTION

By having both Ethernet interface and USB Device interface on the network communication system, users who use it can choose either media interface to interconnect with his external electronics device which may only support one type of interface available. Therefore, it makes the network communication system more flexible to work with any external electronics device.

The proposed invention provides a single-chip USB-to-Ethernet controller ASIC that can operate either as a standalone USB-to-Ethernet controller ASIC in one mode or the Ethernet PHY or the USB-to-Rev-MII Bridging chip in another mode, namely Dual-PHY mode, to interface with an external Network Microcontroller's Ethernet MAC for providing Ethernet and USB Device interface in a network communication system. The combined functions and features make the network communication system design more cost effective, smaller in form-factor and simplified.

The proposed invention solves the restrictions or problems mentioned above by removing the external glue logic such as bus transceiver chip or clock oscillator chip, and by providing a mechanism for auto-detection and auto-selection between the Ethernet interface and USB Device interface through some Station Management Register access as if the Network Microcontroller's Ethernet MAC were accessing two PHY devices through the same Station Management Interface. This makes the system and software design for the Ethernet interface and USB Device interface selection decision much easier and simpler on the Network Microcontroller.

In accordance to an aspect of the invention, a network communication system supports a standalone USB-to-Ethernet controller, comprising:

an Ethernet PHY (physical layer) interface connecting through transformer and RJ-45 connector to Ethernet network by Ethernet cable;

an Ethernet MAC (Media Access Controller) interface connecting to said Ethernet PHY interface;

a USB-to-Ethernet bridge (Universal Serial Bus to Ethernet) interface connecting to said Ethernet MAC;

a packet buffer connecting to said USB-to-Ethernet bridge interface;

a USB PHY/SIE (Serial Interface Engine) interface connecting to said USB-to-Ethernet bridge interface; and a Station Management interface connecting to said USB PHY interface, said Ethernet PHY interface and Ethernet network, wherein said system.

In accordance to another aspect of the invention, a network communication system extends beyond a standalone USB-to-Ethernet controller mode to a Dual-PHY mode capable of being a USB-to-Reverse-MII bridging or Ethernet PHY in Dual-PHY mode, comprising a network microcontroller connecting to a Station Management interface;

a Rev-MII (Reverse Media Independent Interface) type Station Management interface connected to a network microcontroller;

an Ethernet MAC (Media Access Controller) interface connecting to said Rev-MII interface;

a PM (PHY mode) Station Management Register;

a Control (PHY Mode Control or PM-Control) register in said PM Station Management Register; and a MUX (multiplexer) controlled by said PM Station Management Register to select said Ethernet PHY's MII interface or said Rev-MII interface.

In accordance to another aspect of the invention, the network communication system further extends new features for both a standalone USB-to-Ethernet controller mode and a Dual-PHY mode capable of being a USB-to-Reverse-MII bridging or Ethernet PHY in Dual-PHY mode with advanced features including:

two sets of Station Management Register: an Embedded Ethernet PHY's Station Management Register and a PM (PHY mode) Station Management Register for mode configuration and monitoring link status;

a Network Microcontroller's Ethernet MAC (Media Access Controller) driver initializing the Embedded Ethernet PHY to power-on state by accessing said PM_Control register in said PM Station Management Register through the MDC (Management Data Clock) and MDIO (Management Interface) lines, wherein said Station Management interface provides a mechanism for auto-detection and auto-selection between the Ethernet interface and USB Device interface through some Station Management Register access wherein the Network Microcontroller's Ethernet MAC can access two PHY's through the same Station Management interface.

In accordance to another aspect of the invention, the network communication system further extends features including:

said network microcontroller's Ethernet MAC driver periodically polls (or upon receiving the interrupt triggered by the change of link status from either Ethernet interface or USB Device interface followed by polling) the two sets of Station Management Register by reading Basic Mode Status Register (BMSR) of said Ethernet PHY's Station Management Register and PM_BMSR of said PM Station Management Register to check for Ethernet or USB cable connection and link status;

said network Microcontroller's Ethernet MAC driver selects either Embedded Ethernet PHY or USB-to-Rev-MII Bridging interface as active data path based on a link status bit of said PHY mode Basic Mode Status Register (PM_BMSR); and said Embedded Ethernet PHY's Station Management Register or said PM Station Management Register can be selected via a MUX (multiplexer) to communicate with said Network Microcontroller's Ethernet MAC through said Station Management Interface via MDC and MDIO lines; and said network Microcontroller's Ethernet MAC driver continues periodic polling (or upon receiving interrupt triggered by the change of link status from either Ethernet interface or USB Device interface followed by polling) of the two sets of Station Management Register to check for Ethernet or USB cable connection and link status, and upon detecting cable connection and link status change of currently selected or non-selected path, it may choose to change the active data path at any time.

The preferred features may be combined as appropriate, as would be apparent to a skilled person, and may be combined with any of the aspects of the invention.

Further features and advantages of the present invention, as well as the structure and operation of various embodiments of the present invention is described in detail below with reference to the accompanying drawings.

BRIEF DESCRIPTION OF THE DRAWINGS

FIG. 1 illustrates Proposed Invention: Example Network Communication System Featuring Ethernet and USB Interfaces Utilizing the Application Specific Integrated Circuit of the Proposed Invention.

FIG. 2 illustrates System Example Utilizing Proposed Invention: WiMAX Modem Featuring Ethernet and USB Interfaces.

FIG. 3 illustrates System Example Utilizing Proposed Invention: HomePlug Adapter Featuring Ethernet and USB Interfaces.

FIG. 4 illustrates Network Communication System Featuring Ethernet Interface Only.

FIG. 5 illustrates Network Communication System Featuring USB Interface Only.

FIG. 6 illustrates Network Communication System Featuring Ethernet and USB Interfaces.

FIG. 7 illustrates Proposed Invention: Mode 1, USB-to-Ethernet Controller.

FIG. 8 illustrates Proposed Invention: Mode 2, USB-to-Rev-MII Bridging or Ethernet PHY in Dual-PHY Mode.

FIG. 9 illustrates Proposed Invention: Two Sets of Station Management Registers Accessible from the Network Microcontroller's Ethernet MAC in Dual-PHY Mode.

FIG. 10 illustrates Proposed Invention: Embedded Ethernet PHY' Station Management Register is Accessible from USB Host in standalone USB-to-Ethernet Controller Mode.

FIG. 11 illustrates Proposed Invention: Auto-Detection and Auto-Selection between Ethernet PHY and USB-to-Rev-MII Bridging in Dual-PHY mode.

Note 1 on FIG. 11: These signals are: RX_CLK, RX_DV, RXD[3:0], RX_ER, CRS, COL and TX_CLK.

Note 2 on FIG. 11: These signals are: TX_EN, TXD[3:0] and TX_ER. Note 3 on FIG. 11: This signal from PM Station Management Register is controlled by the Network Microcontroller's Ethernet MAC through the MDC/MDIO lines to select the active data path between the Ethernet PHY's MII signals and the USB-to-Rev-MII's MII signals at any time.

Note 4 on FIG. 11: USB cable plugged in or removed by the user or USB Host entering suspend mode is reported to the PM Station Management Register. See PM_BMSR in Table 2.

Note 5 on FIG. 11: Ethernet cable plugged in or removed by the user is reported in Embedded Ethernet PHY's Station Management Register.

Note 6 on FIG. 11: The Network Microcontroller's Ethernet MAC can notify USB Host that whether the USB-to-Rev-MII path is selected as active path or not through the PM Station Management Register.

Note 7 on FIG. 11: The link status change (from link down to link up or vice-versa) from either Ethernet interface or USB Device interface can both trigger an interrupt signal to the Network Microcontroller.

FIG. 12 illustrates Proposed Invention: flow chart of system steps.

FIG. 13 illustrates MAC-to-PHY MII Interface.

FIG. 14 illustrates MAC-to-MAC connection using MII interface.

DETAIL DESCRIPTIONS OF THE INVENTION

As shown in FIG. 1, the proposed invention is a new architecture designed for in a single-chip Application Specific Integrated Circuit (ASIC) to provide the Ethernet and USB connectivity interface. The single-chip ASIC features a single, shared Reverse Media Independent Interface (Rev-MII)/Reverse Reduced Independent Interface (Rev-RMII), an Ethernet PHY interface and a USB Device PHY interface. FIG. 2 illustrates System Example Utilizing Proposed Invention: WiMAX Modem Featuring Ethernet and USB Interfaces. FIG. 3 illustrates System Example Utilizing Proposed Invention: HomePlug Adapter Featuring Ethernet and USB Interfaces.

The single, shared Rev-MII/Rev-RMII interface can be used for interfacing to an external Ethernet MAC device of a common Network Microcontroller and is acting as an Ethernet PHY like device with the same signal pin definition. See FIGS. 13 and 14 for standard MII/RMII interface signal definition. The Ethernet PHY interface contains a physical layer transceiver that is compatible to IEEE802.3u 10BASE-T and 100BASE-TX standards. The USB Device PHY interface contains a USB Device physical layer transceiver that is compliant to USB1.1/2.0 Spec.

The single-chip ASIC architecture provides cost effective, small form-factor, flexible and simplified design architecture in system application. Following figures show some example system applications of the proposed invention.

As shown in FIG. 7 for proposed Invention: Mode 1, USB-to-Ethernet Controller and in FIG. 8 for proposed Invention: Mode 2, USB-to-Rev-MII Bridging or Ethernet PHY in Dual-PHY Mode, the proposed invention is a new single-chip USB-to-Ethernet controller ASIC that can operate in two operation modes:

Operate as a standalone USB-to-Ethernet controller ASIC 700 in one mode of operation as shown in FIG. 7.

Operate with a Network Microcontroller's Ethernet MAC MII interface 808 as an Ethernet PHY chip 806 or a USB-to-Rev-MII Bridging 803 in another mode, namely Dual-PHY mode, as shown in FIG. 8. In Dual-PHY mode, the Network Microcontroller's Ethernet MAC 809, through accessing the Station Management Registers through the MDC/MDIO lines, can detect the Ethernet and USB cable connection and link status and select the active path between the Ethernet PHY and the USB-to-Rev-MII Bridging for operation accordingly.

Note that, in Dual-PHY mode, the same Rev-MII interface can also be configured to operate in Rev-RMII interface.

Implementation Architecture/Algorithm:

The two operation modes are configurable through the hardware pin on the chip or the software register accessible from USB Host. See below table for details.

| 2 Pins | Operation Modes | | Remarks |
|---|---|---|---|
| 00 | MAC mode | Internal PHY | When SSEN bit = 0 in Software |
| 01 | | External MII | Interface Selection register (see |
| 10 | PHY mode | Reverse-MII | page 53 of AX88172A |
| 11 | or | Reverse- | datasheet), the Chip Operation |
| | Dual-PHY | RMII | Mode is determined by two input |
| | mode | | pins during power-on reset. |

Note:
The SSEN bit defaults to 0 after power on reset, meaning that the hardware setting is used to determine Chip Operation Mode during power on reset. Alternatively, after the proposed invention ASIC's USB software driver writes SSEN to 1 during initialization, the Chip Operation Mode can be configured by the Software Interface Selection register vendor command.

As shown in FIG. 9 for Proposed Invention: Two Sets of Station Management Registers Accessible from the Network Microcontroller's Ethernet MAC in Dual-PHY Mode.

In Dual-PHY mode, there are two sets of Station Management Register available for the Network Microcontroller's Ethernet MAC to access, one in the Embedded Ethernet PHY 901 and another called PM (PHY Mode) Station Management Register 904, as shown in FIG. 9. The Network Microcontroller can perform read/write access to either Station Management Registers at any time by specifying the respective "PHY ID" in the Management Frame as defined in IEEE802.3u spec. The "PHY ID" for the two sets of Station Management Register are programmable and stored in the EEPROM being attached to the proposed invention ASIC in system application.

As shown in FIG. 10 for proposed Invention: Embedded Ethernet PHY' Station Management Register 1003 is Accessible from USB Host in standalone USB-to-Ethernet Controller Mode. In standalone USB-to-Ethernet controller mode, the Station Management Register in the Embedded Ethernet PHY is accessible from USB Host, as shown in FIG. 10.

As shown in FIG. 11 and for proposed Invention, Auto-Detection and Auto-Selection between Ethernet PHY 1106 and USB-to-Rev-MII Bridging 1103 in Dual-PHY mode are described in detail.

In Dual-PHY mode, the Network Microcontroller 1108 can select the active data path between the Embedded Ethernet PHY 1106 and the USB-to-Rev-MII Bridging 1103 for operation through write access to the PM Station Management Register 1107, as shown in Note 1, Note 2 and Note 3 in FIG. 11 and PM_Control register description later for example implementation.

For data path selection decision in Dual-PHY mode, if the USB cable is plugged in or removed by the user or any USB link status change event, the USB-to-Rev-MII Bridging path can report the USB active/inactive event to the PM Station Management Register, as shown in Note 4 in FIG. 11, where the Network Microcontroller's Ethernet MAC can read it from time to time or come to know after receiving interrupt generated by the present invention ASIC. Similarly, when the USB Host enters into or resumes from suspend mode, the USB-to-Rev-MII Bridging path can also report this event to the PM Station Management Register.

For data path selection decision in Dual-PHY mode, if the Ethernet cable is plugged in or removed by the user or any Ethernet link status change event, the Embedded Ethernet PHY can report this event to its own Station Management Register, as shown in Note 5 in FIG. 11, where the Network Microcontroller's Ethernet MAC can read it from time to time or come to know after receiving interrupt generated by the present invention ASIC.

For handshaking with USB Host in Dual-PHY mode during data path selection, the Network Microcontroller's Ethernet MAC can indicate to the USB Host that the USB-to-Rev-MII Bridging path is selected as active path or not through the PM Station Management Register, as shown in Note 6 in FIG. 11, by performing a write access to the PM Station Management Register. The status can then be reported through the periodic "Interrupt In" Endpoint to the USB Host. Similarly, the Network Microcontroller's Ethernet MAC can send some control messages to the USB Host through the PM Station Management Register by writing to it. PM Station Management Register map and PM_Control register are described in details in example implementation later for clarity.

FIG. 12 illustrates the implementation flow chart diagram of the invention.

The auto-detection and auto-selection of Ethernet cable is always active in a loop sequence as (pass status to step 1204):

In step 1205, check if Ethernet cable is connected.

In step 1206, The Embedded Ethernet PHY proceeds with auto-negotiation and detects link-up status.

In step 1207, The bit 2 (Link Status) of BMSR register of the Embedded Ethernet PHY's Station Management Register will be asserted.

The auto-detection and auto-selection of USB-to-Rev-MII Bridging is always active in a loop sequence as (pass status to step 1204): In step 1208, check if USB cable is connected.

In step 1209, The USB-to-Rev-MII Bridging has been enumerated and partially initialized by the USB Host?

In step 1210, The bit 2 (Link Status) of PM_BMSR register in PM Station Management Register will be asserted.

In step 1201, Power or Reset is applied to the invention ASIC and then through pin setting to configure the invention ASIC to operate in Dual-PHY mode during power-on reset time.

In step 1202, the Network Microcontroller's Ethernet MAC driver initializes the Embedded Ethernet PHY to power-on state by accessing the PM_Control register in PM Station Management Register through the MDC/MDIO lines.

In step 1203, the Network Microcontroller's Ethernet MAC driver initializes the Embedded Ethernet PHY to non-reset state by accessing the PM_Control register in PM Station Management Register through the MDC/MDIO lines.

In step 1204, checking for Ethernet or USB cable connection and link status, the Network Microcontroller's Ethernet MAC driver periodically polls (or upon receiving interrupt triggered by the change of link status from either Ethernet interface or USB Device interface followed by polling) the two sets of Station Management Register by reading BMSR of the Embedded Ethernet PHY's Station Management Register and PM_BMSR of PM Station Management Register.

In step 1211, Select either Embedded Ethernet PHY or USB-to-Rev-MII Bridging interface as active data path.

if Embedded Ethernet PHY is selected, go to step 1221, if USB-to-Rev-MII Bridging is selected, go to step 1231.

For Ethernet PHY path:

In step 1221, the Network Microcontroller's Ethernet MAC driver should set bit 15 (Path Select=1) and bit 8 (Media Info=1) of PM_Control register in PM Station Management Register through the MDC/MDIO lines.

In step 1222, the Network Microcontroller's Ethernet MAC driver should read the auto-negotiation result from the Embedded Ethernet PHY and then set its Ethernet MAC to operate at the same speed (either 10BASE-T or 100BAST-TX) and duplex mode (either half or full) accordingly.

In step 1223, the Ethernet connection initialization is finished. The packet transmit and receive function between the Network Microcontroller's Ethernet MAC and the Embedded Ethernet PHY is now ready.

In step 1224, Ethernet cable disconnected to cause link-down or any link status change.

In step 1225, the bit 2 (Link Status) of BMSR register of the Embedded Ethernet PHY's Station Management Register will be de-asserted.

For USB-to-Rev-MII Bridging path:

In step 1231, the Network Microcontroller's Ethernet MAC driver should set bit 15 (Path Select=0) and bit 8 (Media Info=0) of PM_Control register in PM Station Management Register through the MDC/MDIO lines.

In step 1232, through the periodic "Interrupt In" Endpoint, the USB-to-Rev-MII Bridging then reports the Rev-MII interface link-up condition to the USB software driver (typically on a PC with USB Host).

In step 1233, after receiving the link-up condition, the USB software driver then continues the remaining network initialization steps, including setting the Ethernet MAC within the invention ASIC to fix at 100Base-TX and full-duplex operation mode, to enable the USB interface of the Network Communication System utilizing the invention ASIC. After done with network initialization steps, the packet transmit and receive function between the Network Microcontroller's Ethernet MAC and the USB-to-Rev-MII Bridging is now ready.

In step 1234, check if USB cable disconnected or the PC with USB Host entered Suspend mode.

In step 1235, if suspended, then the bit 2 (Link Status) of PM_BMSR register in PM Station Management Register will be de-asserted.

Both step paths merge into step 1226, the Network Microcontroller's Ethernet MAC driver continues periodic polling (or upon receiving interrupt triggered by the change of link status from either Ethernet interface or USB Device interface followed by polling) of the two sets of Station Management Register to check for Ethernet or USB cable connection and link status.

Upon detecting cable connection and link status change of currently selected or non-selected path, it may choose to change the active data path at any time.

Loop back to step 1211.

An Example Programming Procedure is presented below. For clarity of the example, a detailed table for the PM Station Management Register Map for PM_BMSR and PM_Control registers, which are more relevant to the proposed invention, is listed.

TABLE 1

PM Station Management Register Map in Dual-PHY Mode

| Address | Register Name | Description |
|---|---|---|
| 00h | PM_BMCR | Basic mode control register, basic register. |
| 01h | PM_BMSR | Basic mode status register, basic register. |
| 02h | PM_PHYIDR1 | PHY identifier register 1, extended register. |

TABLE 1-continued

PM Station Management Register Map in Dual-PHY Mode

| Address | Register Name | Description |
|---|---|---|
| 03h | PM_PHYIDR2 | PHY identifier register 2, extended register. |
| 04h | PM_ANAR | Auto negotiation advertisement register, extended register. |
| 05h | PM_ANLPAR | Auto negotiation link partner ability register, extended register. |
| 06h | PM_ANER | Auto negotiation expansion register, extended register. |
| 10h | PM_Control | PHY Mode control register of proposed invention. *** |

TABLE 2

PM_BMSR REGISTER, ADDRESS = 01H

| Bit | Bit Name | Default | Description |
|---|---|---|---|
| 15 | 100BASE-T4 | 0, RO | 100BASE-T4 capable:<br>0: This PHY is not able to perform in 100BASE-T4 mode. |
| 14 | 100BASE-TX full duplex | 1, RO | 100BASE-TX full-duplex capable:<br>1: This PHY is able to perform in 100BASE-TX full-duplex mode. |
| 13 | 100BASE-TX half duplex | 0, RO | 100BASE-TX half-duplex capable:<br>0: This PHY is not able to perform in 100BASE-TX half-duplex mode. |
| 12 | 10BASE-T full duplex | 0, RO | 10BASE-T full-duplex capable:<br>0: This PHY is not able to perform in 10BASE-T full-duplex mode. |
| 11 | 10BASE-T half duplex | 0, RO | 10BASE-T half-duplex capable:<br>0: This PHY is not able to perform in 10BASE-T half-duplex mode. |
| 10:7 | Reserved | 0, RO | Reserved. Write as 0, read as "don't care". |
| 6 | MF preamble suppression | 0, RO | Management frame preamble suppression:<br>0: This PHY will not accept management frames with preamble suppressed. |
| 5 | Auto-negotiation complete | 1, RO | Auto-negotiation completion:<br>1: Auto-negotiation process completed<br>0: Auto-negotiation process not completed |
| 4 | Remote fault (Not supported) | 0, RO | Remote fault:<br>1: Remote fault condition detected (cleared on read or by a chip reset)<br>0: No remote fault condition detected |
| 3 | Auto-negotiation ability | 1, RO | Auto configuration ability:<br>1: This PHY is able to perform auto-negotiation. |
| 2 | Link status | 0, RO | Link status:<br>1: Valid link established (indicate that USB software initialization is finished and not in USB suspend mode)<br>0: Link not established (indicate that USB software initialization is not finished or in USB suspend mode) |
| 1 | Jabber detect | 0, RO | Jabber detection:<br>1: Jabber condition detected<br>0: No Jabber condition detected |
| 0 | Extended capability | 1, RO | Extended capability:<br>1: Extended register capable<br>0: Basic register capable only |

PM_Control Register:

TABLE 2

PM_control, Address 10h

| Bit | Bit Name | Default | Description |
|---|---|---|---|
| 15 | Path Select | 0, RW | Path selection. This bit is only valid in Dual-PHY mode.<br>1: Select Embedded Ethernet PHY as active data path.<br>0: Select USB-to-Rev-MII Bridging as active data path. |
| 14 | Reset embedded PHY | 0, RW | Reset embedded Ethernet PHY. This bit is only valid in Dual-PHY mode.<br>1: Embedded Ethernet PHY is in operating state.<br>0: Embedded Ethernet PHY is in reset state. After writing '0', external Ethernet MAC software should write '1' to exit the reset state. |
| 13 | Power down embedded PHY | 0, RW | Power down embedded Ethernet PHY. This bit is only valid in Dual-PHY mode.<br>1: Embedded Ethernet PHY is in operating state.<br>0: Embedded Ethernet PHY is in power-down state. After writing '0', external Ethernet MAC software should write '1' to exit the power-down state. |

TABLE 2-continued

PM_control, Address 10h

| Bit | Bit Name | Default | Description |
|---|---|---|---|
| 12 | SSEN | 0, RO | SSEN: Software Setting Enable.<br>This bit is the same as SSEN bit in Software Interface Selection register. |
| 11:9 | Reserved | 0, RW | Reserved. |
| 8 | Media Information | 1, RW | Media Information bit 8, MDINF [8].<br>This bit is reported to the proposed invention ASIC's USB software driver in MDINF [8] bit of Interrupt Endpoint.<br>When the proposed invention ASIC operates in PHY mode, the typical usage is to indicate to the ASIC USB software driver that the external Ethernet MAC has finished initialization and is ready to send and receive packets with the ASIC, by writing '0' to this bit. Also, any time when external Ethernet MAC can't be set online for any reasons, it can write '1' to this bit to inform the ASIC USB software driver.<br>When the proposed invention ASIC operates in Dual-PHY mode, the typical usage is to indicate to the ASIC USB software driver that the external Ethernet MAC has selected USB-to Rev-MII bridging engine as active data path and has finished initialization and is ready to send and receive packets with the ASIC, by writing '0' to this bit. If external Ethernet MAC switches the active data path to embedded Ethernet PHY, it should write '1' to this bit to inform the ASIC USB software driver also.<br>This bit can also function as a link-up remote wake event in PHY/Dual-PHY mode. In other words, after the ASIC enters into suspend mode instructed by the USB Host, the external Ethernet MAC can write this bit to have a '1' to '0' transition which will be used as link-up remote wakeup trigger event to awake the ASIC and the USB Host. |
| 7:0 | Media Information | 0x00, RW | Media Information bit [7:0], MDINF [7:0].<br>This 8 bits data is reported to the ASIC USB software driver in MDINF [7:0] bits of Interrupt Endpoint.<br>When the ASIC operates in PHY/Dual-PHY mode, the external Ethernet MAC can define some command codes to send some messages to the ASIC USB software driver using this byte. |

In order to configure the ASIC, the Network Microcontroller's Ethernet MAC driver must identify the PHY_ID of proposed invention ASIC's Embedded Ethernet PHY and the PM Station Management Interface (this may be defined in EEPROM).

1. Write PM_Control Register with 0x2100 to power-up the proposed invention ASIC's Embedded Ethernet PHY.

2. Write PM_Control Register with 0x6000 to set the Embedded Ethernet PHY to operating state.

3. The Network Microcontroller's Ethernet MAC driver should check the link status of the Embedded Ethernet PHY and the USB-to-Rev-MII Bridging periodically by reading the bit 2 of BMSR in the Embedded Ethernet PHY and the bit 2 of PM_BMSR in PM Station Management Register in the proposed invention ASIC and then select the data path which will be activated.

4. To select USB-to-Rev-MII Bridging as the active data path, write PM_Control Register with 0x6000 and MDINF [8]=0. The ASIC USB software driver will detect link-up condition.

5. If the Network Microcontroller's Ethernet MAC wants to send packets to Embedded Ethernet PHY, write PM_Control Register with 0xE100 to select Embedded Ethernet PHY as active data path, and MDINF[8]=1. The ASIC USB software driver will detect the link-down condition.

The system applications of the proposed invention are not limited to the WiMAX or the HomePlug related network communication system as illustrated in section 1. The intention of the proposed invention is to allow it to interface with any type of Network Microcontroller featuring Ethernet MAC for providing Ethernet interface and USB Device interface for it.

Although illustrative embodiments have been described herein with reference to the accompanying drawings is exemplary of a preferred single standalone mode USB-to-Ethernet controller, or USB-to-Rev-MII Bridging or Ethernet PHY Dual-PHY mode system and method which may be implemented in the present invention, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

Terminology and Lexicography:

MII: The standard Media Independent Interface signals are defined in Clause 22 of IEEE 802.3u standard. The MI signals include two signals for Station Management, 9 signals for MII RX and 7 signals for MII TX.

RMII: The Reduced Media Independent Interface signals with reduced signals from MII. The RMII signals include 2 signals for Station Management, 6 signals for MII RX and 3 signals for RMII TX.

MDIO/MDC: the Station Management Interface for Ethernet MAC of Network Microcontroller to control/configure its operation mode or check its operation status via the commonly used Station Management Interface (MDC and MDIO lines) as defined in IEEE 802.3u standard.

The invention claimed is:

1. A network communication system, comprising:
   an Ethernet PHY (physical layer) interface connecting through transformer and RJ-45 connector to Ethernet network by Ethernet cable;
   an Ethernet MAC (Media Access Controller) interface connecting to said Ethernet PHY interface;
   a USB-to-Ethernet bridge (Universal Serial Bus to Ethernet) interface connecting to said Ethernet MAC;
   a packet buffer connecting to said USB-to-Ethernet bridge interface;

a USB PHY/SIE (Serial Interface Engine) interface connecting to said USB-to-Ethernet bridge interface;

a Station Management interface connecting to said USB PHY/SIE interface, said Ethernet PHY interface and Ethernet network, wherein said system operates as a USB-to-Ethernet controller or as a USB-to-Reverse-MII (USB-to-Reverse-Media Independent Interface) Bridging or Ethernet PHY in Dual-PHY mode; and said Station Management interface provides a mechanism for auto-detection and auto-selection between external Ethernet interface and USB Device interface through Station Management Register access wherein the Network Microcontroller's Ethernet MAC access said USB PHY/SIE interface and said Ethernet PHY interface through the same Station Management interface.

2. A network communication system in accordance with claim 1, further comprises:

a PM (PHY mode) Station Management Register including a PM_Control (PHY mode control) register in said PM Station Management Register; and a Network Microcontroller's Ethernet MAC (Media Access Controller) driver initializing an Embedded Ethernet PHY to power-on state by accessing said PM_Control register in said PM Station Management Register through a MDC (Management Data Clock) and MDIO (Management Interface) lines.

3. A network communication system in accordance with claim 2, further comprises a network microcontroller connecting to said Station Management interface;

a Rev-MII (Reverse Media Independent Interface) type Station Management interface connected to said network microcontroller;

said Ethernet MAC (Media Access Controller) interface connecting to said Rev-MII interface; and a MUX (multiplexer) controlled by said PM Station Management Register to select an Ethernet PHY's MII (Media Independent Interface) interface or a Rev-MII interface.

4. A network communication system in accordance with claim 3 further comprises two sets of Station Management Register: an Embedded Ethernet PHY's Station Management Register and said PM Station Management Register for mode configuration and link status monitoring.

5. A network communication system in accordance with claim 4, wherein said Embedded Ethernet PHY's Station Management Register or said PM Station Management Register selected via a MUX (multiplexer) to communicate with said Network Microcontroller's Ethernet MAC through said Station Management Interface via said MDC and said MDIO lines.

6. A network communication system in accordance with claim 5, wherein bit field from said PM Station Management Register is controlled by said Network Microcontroller's Ethernet MAC through the MDC and MDIO lines to select an active data path between Ethernet PHY's MII signals and USB-to-Rev-MII Bridging's MII signals.

7. A network communication system, comprising:

a network microcontroller connecting to a Station Management interface;

a Rev-MII (Reverse Media Independent Interface) type Station Management interface connected to a network microcontroller;

an Ethernet MAC (Media Access Controller) interface connecting to said Rev-MII interface;

a USB-to-Ethernet bridge interface connecting to said Ethernet MAC;

a packet buffer connecting to said USB-to-Ethernet bridge interface;

a USB PHY/SIE (Serial Interface Engine) interface connecting to said USB-to-Ethernet bridge interface;

an Ethernet PHY (physical layer) interface connecting through transformer and RJ-45 connector to Ethernet network by Ethernet cable;

a PM (PHY mode) Station Management Register;

a MUX (multiplexer) controlled by said PM Station Management Register to select said Ethernet PHY interface or said Rev-MII interface; and a Station Management interface connecting to said USB PHY/SIE interface, Ethernet PHY's MII interface and Ethernet network.

8. A network communication system in accordance with claim 7, wherein said system operates as a USB-to-Ethernet controller or as a USB-to-Reverse-MII (USB-to-Reverse-Media Independent Interface) Bridging or Ethernet PHY in Dual-PHY mode.

9. A network communication system in accordance with claim 8, wherein said network communication system further comprise a MUX (multiplexer) controlled by said PM Station Management Register to select said Ethernet PHY's MII (Media Independent Interface) interface or said Rev-MII interface.

10. A network communication system in accordance with claim 8, further comprises:

a Station Management interface connecting to said USB PHY/SIE interface, said Ethernet PHY interface and Ethernet network.

wherein said system operates as a USB-to-Ethernet controller in Dual-PHY mode;

a PM_Control (PHY mode control) register in said PM Station Management Register;

a Network Microcontroller's Ethernet MAC (Media Access Controller) driver initializing an Embedded Ethernet PHY to power-on state by accessing said PM_Control register in said PM Station Management Register through MDC (Management Data Clock) and MDIO (Management Interface) lines, wherein said Station Management interface provides a mechanism for auto-detection and auto-selection between external Ethernet interface and USB Device interface through Station Management Register access wherein the Network Microcontroller's Ethernet MAC access said USB PHY/SIE interface and said Ethernet PHY interface through the same Station Management interface.

11. A network communication system in accordance with claim 10, further comprises two sets of Station Management Register: an Embedded Ethernet PHY's Station Management Register and said PM Station Management Register for mode configuration and link status monitoring.

12. A network communication system in accordance with claim 11, wherein said Embedded Ethernet PHY's Station Management Register or said PM Station Management Register selected via a MUX (multiplexer) to communicate with said Network Microcontroller's Ethernet MAC through said Station Management Interface via said MDC and said MDIO lines.

13. A network communication system in accordance with claim 11, wherein bit field from said PM Station Management Register is controlled by said Network Microcontroller's Ethernet MAC through the MDC and MDIO lines to select an active data path between Ethernet PHY's MII signals and USB-to-Rev-MII's signals.

14. A network communication system, comprising:
- a network microcontroller connecting to a Station Management interface;
- said Station Management interface connecting to a USB (Universal Serial Bus) PHY (physical layer) interface, an Ethernet PHY interface and Ethernet network, wherein said system operates as a USB-to-Ethernet controller in Dual-PHY mode;
- two sets of Station Management Registers: an Embedded Ethernet PHY's Station Management Register and a PM (PHY mode) Station Management Register for mode configuration and link status monitoring;
- a PM_Control (PHY mode control) register in said PM Station Management Register; and
- a Network Microcontroller's Ethernet MAC (Media Access Controller) driver initializing an Embedded Ethernet PHY to power-on state by accessing said PM_Control register in said PM Station Management Register through MDC (Management Data Clock) and MDIO (Management Interface) lines,
- wherein said Station Management interface provides a mechanism for auto-detection and auto-selection between external Ethernet interface and USB Device interface through Station Management Register access wherein the Network Microcontroller's Ethernet MAC access a USB PHY/SIE interface and an Ethernet PHY interface through said Station Management interface.

15. A network communication system in accordance with claim 14, wherein said Network Microcontroller's Ethernet MAC driver reads auto-negotiation result from said Embedded Ethernet PHY and then sets said Ethernet MAC to operate at same speed.

16. A network communication system in accordance with claim 15, further comprises:
- an Ethernet PHY interface connecting through transformer and RJ-45 connector to Ethernet network by Ethernet cable;
- an Ethernet MAC interface connecting to said Ethernet PHY interface;
- a USB-to-Ethernet bridge (Universal Serial Bus to Ethernet) interface connecting to said Ethernet MAC;
- a packet buffer connecting to said USB-to-Ethernet bridge interface;
- a USB PHY/SIE (Serial Interface Engine) interface connecting to said USB-to-Ethernet bridge interface; and
- a Station Management interface connecting to said USB PHY/SIE interface, said Ethernet PHY interface and Ethernet network, wherein said system operates as a USB-to-Ethernet controller.

17. A network communication system in accordance with claim 16, wherein said further comprises:
- a Rev-MII (Reverse Media Independent Interface) type Station Management interface connected to a network microcontroller; and
- a MUX (multiplexer) controlled by said PM Station Management Register to select said Ethernet PHY's MII interface or said Rev-MII interface,
- wherein said system operates as a USB-to-Ethernet controller or as a USB-to-Reverse-MII (USB-to-Reverse-Media Independent Interface) Bridging or Ethernet PHY in Dual-PHY mode.

18. A network communication system in accordance with claim 17, wherein said network microcontroller's Ethernet MAC driver periodically polls said two sets of Station Management Register by reading Basic Mode Status Register (BMSR) of said Ethernet PHY's Station Management Register and PM_BMSR of said PM Station Management Register, or upon receiving the interrupt triggered by the change of link status from either Ethernet interface or USB Device interface to check for Ethernet or USB cable connection and link status.

19. A network communication system in accordance with claim 18, wherein said network Microcontroller's Ethernet MAC driver selects either Embedded Ethernet PHY or USB-to-Rev-MII Bridging interface as an active data path based on a link status bit of Basic Mode Status Register (BMSR) of said Ethernet PHY and said PHY mode Basic Mode Status Register (PM_BMSR).

20. A network communication system in accordance with claim 19, wherein said network Microcontroller's Ethernet MAC driver selects to change the active data path upon detecting cable connection and link status change of currently selected or non-selected path.

* * * * *